United States Patent [19]

Barton et al.

[11] Patent Number: 5,312,649
[45] Date of Patent: May 17, 1994

[54] DIORGANOSILACETYLENE-ALT-DIORGANOSILVINYLENE POLYMERS AND A PROCESS DENSIFYING POROUS SILICON-CARBIDE BODIES

[75] Inventors: Thomas J. Barton; Sina Ijadi-Maghsoodi; Yi Pang, all of Ames, Iowa

[73] Assignee: Iowa State University Research Foundation, Inc., Ames, Iowa

[21] Appl. No.: 73,589

[22] Filed: Jun. 8, 1993

Related U.S. Application Data

[62] Division of Ser. No. 817,602, Jan. 7, 1992, Pat. No. 5,241,029.

[51] Int. Cl.$^5$ .................................. C04B 41/83
[52] U.S. Cl. ...................... 427/228; 427/226
[58] Field of Search .............. 427/226, 228, 387

[56] References Cited

U.S. PATENT DOCUMENTS

| 4,100,233 | 7/1978 | Yajima et al. | 423/345 |
|---|---|---|---|
| 4,117,057 | 9/1978 | Yajima et al. | 264/63 |
| 4,374,793 | 2/1983 | Koga et al. | 264/65 |
| 4,800,221 | 1/1989 | Marko | 528/10 |
| 4,806,612 | 2/1989 | Chandra et al. | 528/10 |
| 4,923,949 | 5/1990 | Iwahara et al. | 528/33 |
| 4,940,767 | 7/1990 | Barton et al. | 528/35 |
| 4,965,332 | 10/1990 | Barton et al. | 528/25 |
| 4,996,341 | 2/1991 | Iwahara et al. | 556/406 |
| 5,162,478 | 11/1992 | Barton et al. | 528/15 |
| 5,196,235 | 3/1993 | Parlier et al. | 427/214 |

FOREIGN PATENT DOCUMENTS

914935   1/1963  United Kingdom.
2204041A 11/1988 United Kingdom.

OTHER PUBLICATIONS

T. J. Barton et al., *Silicon–Based Polymer Science: A Comprehensive Resource*, American Chemical Society: Washington, D.C., 1990, Chapter 1.
T. J. Barton et al., "Thermal and Catalytic Polymerization of Diethynyldiphenylsilane", *Macromolecules*, 24, 1257–1260 (1991).
I. M. Gverdtsiteli et al., *Soobschch. Akad. Nauk Gruz. SSR*, 66, 77–80 (1972) in a language in which Applicants' Representatives are not fluent. The structures indicate the document discloses silicon-vinylene polymers.
Ijadi-Maghsoodi et al., "Synthesis and Study of Silylene-Diacetylene Polymers", *Macromolecules*, 23, 4485–4486 (1990).
Ijadi-Maghsoodi et al., "Efficient, 'One-Pot' Synthesis of Silylene-Acetylene and Disilylene-Acetylene Preceramic Polymers from Trichloroethylene", *J. Polymer Science: Part A: Polymer chemistry*, 28, 955–965 (1990).
*Metalloorg. Khim.*, 1, 712–713 (1988) is in a language in which Applicants' Representatives are not fluent. The figures disclose structures containing discreet silicon-acetylene-vinylene compounds.
Nitta et al, *Chemical Abstracts*, 107, 856 (1987), Abstract No. 107:166920c.

(List continued on next page.)

*Primary Examiner*—Joseph L. Schofer
*Assistant Examiner*—Mark Nagumo
*Attorney, Agent, or Firm*—Schwegman, Lundberg & Woessner

[57] ABSTRACT

The present invention provides linear organosilicon polymers including acetylene and vinylene moieties, and a process for their preparation. These diorganosilacetylene-alt-diorganosilvinylene linear polymers can be represented by the formula: $-[-(R^1)(R^2)Si-C\equiv C-(R^3)(R^4)Si-CH=CH-]_n-$, wherein $n \geq 2$; and each $R^1$, $R^2$, $R^3$, and $R^4$ is independently selected from the group consisting of hydrogen, halogen, alkyl, alkenyl, aryl, and aralkyl radicals. The polymers are soluble in organic solvents, air stable, and can be pulled into fibers or cast into films. They can be thermally converted into silicon carbide ceramic materials.

11 Claims, No Drawings

OTHER PUBLICATIONS

Pang, "Exploring novel silicon-containing polymers, from preceramic polymers to conducting polymers with nonlinear optical properties", An abstract of dissertation submitted to the Iowa State University Thesis Office Dec. 26, 1990.

R. W. Rice, "Ceramics from Polymer Pyrolisis, Opportunities and Needs-A Materials Perspective", *Ceramic Bulletin*, 62, 889–892 (1983).

M. G. Voronkov et al., English translation of article in *Izv. Akad. Nauk SSR, Ser. Khim.*, No. 8, 1911 (1981).

M. G. Voronkov et al., *Metalloorg. Khim.*, 2, 463–465 (1989) is in a language in which Applicants' Representatives are not fluent. An English language abstract (*Chem. Abs.*, 111, 805 (1989 Abstract No. 111:232965g) discloses structures containing discreet silicon-acetylene-vinylene compounds, including cyclic structures.

R. West et al., "Polysilastyrene: Phenylmethylsilane-Dimethylsilane Copolymers as Precursors to Silicon Carbide", *Ceramic Bulletin*, 62, 899–903 (1983).

O. G. Yarosh et al., English translation of article in *Izv. Akad. Nauk SSR, Ser. Khim.*, No. 11, 2637 (1985).

O. G. Yarosh et al., *Metalloorg. Khim.*, 1 773 (1988) (*Chem. Abst.*, 111, 782 (1989), Abstract No. 111: 1948839j).

O. G. Yarosh et al., *Metalloorg. Khim.*, 2 515 (1989) (*Chem. Abst.*, 112, 763 (1990) Abstract No. 112:98624k).

DIORGANOSILACETYLENE-ALT-DIORGANOSILVINYLENE POLYMERS AND A PROCESS DENSIFYING POROUS SILICON-CARBIDE BODIES

The present invention was made with Government support under Contract No. W-7405-ENG-82 awarded by Department of Energy. The Government has certain rights in the invention.

This is a division of application Ser. No. 07/817,602, filed Jan. 7, 1992, U.S. Pat. No. 5,241,029

FIELD OF THE INVENTION

The present invention relates generally to organosilicon polymeric materials that can be converted to silicon carbide upon heating.

BACKGROUND OF THE INVENTION

Silicon carbide, SiC, is a covalent crystalline material with the diamond structure. It can be produced in block form by the reaction of $SiO_2$ with carbon within a temperature range of about 1,900–2,200° C. SiC is generally chemically inert, extremely hard, and has a high thermal conductivity and low thermal expansion. It can be used in a variety of high temperature applications, such as electrical heating units, furnace walls, mufflers, abrasives, rocket nozzles, as well as engine and turbine parts.

In order to produce a silicon carbide product having a particularly defined shape, the above described block can be crushed and cleaned by washing with acid and alkali. The resultant powder can then be molded and sintered to form pressureless or reaction sintered SiC shapes. This method is not readily adapted to forming SiC films or fibers, however.

In an effort to produce SiC films and fibers, organosilicon polymeric materials have been used as ceramic precursors to the fibers. For example, polysilanes (containing $R_2Si$ and $RSi$ units) and polycarbosilanes (containing $R_2SiCH_2$ units) are such preceramic polymers that can be converted into ceramic materials by pyrolysis, i.e., by heating the materials at elevated temperatures. See, for example, R. West et al., *Am. Ceram. Soc. Bull.*, 62, 899 (1983); and S. Yajima in *Handbook of Composites*: Eds, E. Watt and B.V. Perov; Elsevier, New York; Vol. 1, Ch. VI, pp. 201-37, 1985. More recently, silicon acetylene polymers, which can be cast into films and fibers, have been shown to produce SiC by pyrolysis. See, for example, U.S. Pat. Nos. 4,940,767 (Barton et al., July 10, 1990) and 4,965,332 (Barton et al., Oct. 23, 1990). Multistep preparation and purification processes and/or the presence of large quantities of unwanted by-products, such as salts, have made many of these methods inefficient, costly, and commercially unattractive.

It is a principal object of the present invention, therefore, to provide an organosilicon polymer that can be used directly and conveniently to form ceramic films and fibers. Another object of the present invention is to provide an organosilicon polymer that can undergo thermolysis to SiC. A further object of the invention is to provide an easy, efficient, clean, and fast process for preparing organosilicon polymers, and the subsequent SiC products, in high char yields, i.e., wherein high total yields of the SiC are obtained from the polymer after pyrolysis.

SUMMARY OF THE INVENTION

These and other objects are achieved by the present invention, which is directed to the preparation and use of novel organosilicon polymers that can be molded into preselected shapes and subsequently transformed into useful silicon carbide products by exposure to elevated temperatures. The organosilicon polymers of the present invention are particularly desirable because they are easily handled and can be readily converted into SiC ceramic materials. Herein, the term "ceramic" refers to a product made by baking or firing a nonmetallic mineral at a high temperature. A "SiC ceramic" refers to the ceramic char produced at an elevated temperature. This char does not significantly decrease in weight upon further exposure to the elevated temperature. It consists primarily of silicon and carbon.

The organosilicon polymers of the present invention are generally air stable and soluble in a variety of organic solvents. They can be reversibly melted, pulled into fibers, cast into films, and prepared as powders or coatings. They can be converted into ceramic silicon carbide materials upon heating, or they can be used for densification of silicon carbide bodies.

The preceramic organosilicon polymers of the present invention contain acetylene and vinylene groups in a linear arrangement. Preferably the acetylene and vinylene groups are in an alternating arrangement. The polymers can be represented by the formula $-[-(R^1)(R^2)Si-C\equiv C-(R^3)(R^4)Si-CH=CH-]-_n$ —with a weight average molecular weight of at least about 2,000, wherein $n \geq 2$, and $R^1$, $R^2$, $R^3$, and $R^4$ are independently selected from the group consisting of hydrogen, halogen, alkyl, alkenyl, aryl, and aralkyl radicals. Herein, "preceramic" refers to materials that are capable of being fired at high temperatures to form ceramic materials.

Preferably, the polymers have a weight average molecular weight of between about 2,000 and about 120,000. More preferably, the polymers have a weight average molecular weight of between about 10,000 and about 60,000. Preferably, $n = 2$–800, more preferably $n = 20$–500, and most preferably $n = 200$–300.

Preferably, each $R^1$, $R^2$, $R^3$, and $R^4$ is independently selected from the group consisting of hydrogen, alkyl, alkenyl, aryl, and aralkyl radicals. More preferably, $R^1$, $R^2$, $R^3$, and $R^4$ are independently selected from the group consisting of hydrogen, $(C_1-C_{20})$alkyl, $(C_2-C_{20})$alkenyl, $(C_6-C_{17})$aryl, and $(C_7-C_{20})$aralkyl radicals. Most preferably, each $R^1$, $R^2$, $R^3$, and $R^4$ is independently selected from the group consisting of hydrogen, $(C_1-C_6)$alkyl, $(C_2-C_6)$alkenyl, and $(C_6-C_{17})$aryl.

These polymers can be referred to as diorganosilacetylene-alt-diorganosilvinylene (SASV) polymers. They can be prepared in an efficient, one pot, single step synthesis in relatively high char yields and of relatively high structural purity. The process involves the catalytic hydrosilation of the monomers of the general formula $H(R^1)(R^2)Si-C\equiv C-(R^3)(R^4)Si-C\equiv CH$, wherein $R^1$, $R^2$, $R^3$, and $R^4$ are as defined above.

The term "alkyl" means a saturated linear, branched, or cyclic hydrocarbon radical. The term "alkenyl" means an unsaturated linear, branched, or cyclic hydrocarbon radical. The term "aryl" means a mono-or polynuclear aromatic hydrocarbon radical. The term "aralkyl" means a linear, branched, or cyclic alkyl hydrocarbon radical having at least one mono- or polynuclear aromatic or heteroaromatic substituent. The term "polymeric" or "polymer" is used herein in its usual manner to mean a compound consisting essentially of repeating structural units.

DETAILED DESCRIPTION OF THE INVENTION

The present invention is based upon the discovery that novel organosilicon polymers containing acetylene and vinylene groups can be easily molded into desirable shapes, such as films and fibers, and transformed into ceramic silicon carbide materials. These novel preceramic organosilicon polymers preferably contain alternating acetylene and vinylene groups. They can be referred to as diorganosilacetylene-alt-diorganosilvinylene (SASV) polymers.

The preferred organosilicon polymers of the present invention are represented by the formula —[—($R^1$)($R^2$)Si—C≡C—($R^3$)($R^4$) Si—CH=CH—]$_n$—, wherein n≧2, and each $R^1$, $R^2$, $R^3$, and $R^4$ is independently selected from the group consisting of hydrogen, halogen, alkyl, alkenyl, aryl, and aralkyl radicals. Examples of suitable R groups include, but are not limited to, hydrogen, methyl, ethyl, propyl, butyl, pentyl, hexyl, heptyl, octyl, phenyl, and vinyl groups.

The preferable polymers have a weight average molecular weight of at least about 2,000. Preferably, the number of recurring units in the polymer, i.e., "n," is between about 2 and 800, more preferably n=20-500, and most preferably n=200-300.

Preferably, these organosilicon polymers have a weight average molecular weight of between about 2,000 and about 120,000. More preferably, they have a weight average molecular weight of between about 10,000 and about 60,000. The polydispersity, which is a measure of the molecular weight dispersity, i.e., nonhomogeneity, within the system, is between about 1.01 and about 10.0. Preferably it is between about 1.05 and about 5.0, and most preferably between about 1.5 and about 3.0. The polydispersity is determined by the ratio of the weight average molecular weight (Mw) to the number average molecular weight (Mn).

Preferably, each of the substituents $R^1$, $R^2$, $R^3$, and $R^4$ in these organosilicon polymers is independently selected from the group consisting of hydrogen, alkyl, alkenyl, aryl, and aralkyl radicals. More preferably, each $R^1$, $R^2$, $R^3$, and $R^4$ is independently selected from the group consisting of hydrogen, ($C_1$-$C_{20}$)alkyl, ($C_2$-$C_{20}$)alkenyl, ($C_6$-$C_{17}$)aryl, and ($C_7$-$C_{20}$)aralkyl radicals. Most preferably, each $R^1$, $R^2$, $R^3$, and $R^4$ is independently selected from the group consisting of hydrogen, ($C_1$-$C_6$)alkyl, ($C_2$-$C_6$)alkenyl, and ($C_6$-$C_{17}$)aryl.

The diorganosilacetylene-alt-diorganosilvinylene polymers are white, stable preceramic polymers. By "stable," it is meant that the polymers do not substantially react or break-down when exposed to air. They are preferably air stable over a period of several months, and can be stored for several years in an inert atmosphere. They can be reversibly melted, i.e., the polymers can be repeatedly liquified and solidified without any significant change in their properties. Preferably, the preceramic polymers of the present invention have a softening or melting temperature within a range of about 20° C. to about 300° C., and more preferably within a range of about 70° C. to about 250° C. They are also generally soluble in organic solvents such as chloroform, benzene, toluene, tetrahydrofuran (THF), and the like. The solubilities of the polymers are typically at least about 200 grams per liter; however this varies depending on the pendant groups and the solvents chosen.

The polymers of the present invention can be pulled into fibers, cast into films, molded into monolithic forms, and prepared as powders or coatings, as well as formed into numerous preselected shapes. They are advantageous at least because they do not lose their shape upon pyrolysis. That is, the polymers of the present invention can be shaped and thermally converted into ceramic silicon carbide materials, as confirmed by x-ray analysis. The material produced upon pyrolysis typically includes SiC and excess C.

The present invention also provides a process of preparing the diorganosilacetylene-alt-diorganosilvinylene polymers of the present invention. The process involves the catalytic hydrosilation of acetylene-containing monomers of the general formula H($R^1$)($R^2$)Si—C≡C—($R^3$)($R^4$)Si—C≡CH. These monomers are referred to as 3,6-disilahexa-1,4-diynes. The "hydrosilation" reaction, which involves the addition of an Si-H bond to an acetylene moiety in the presence of a catalyst, can be represented by the following generalized scheme:

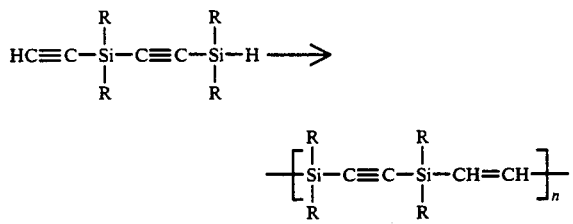

In the formula for the monomers, the pendant R groups may be the same or different. Generally speaking, they are hydrogen, halogen, or organic moieties as described above for the polymers. Each "R" group is independently selected from the group consisting of hydrogen, halogen, alkyl, alkenyl, aryl, and aralkyl radicals. Preferably, each "R" group is independently selected from the group consisting of hydrogen, ($C_1$-$C_{20}$)alkyl, ($C_2$-$C_{20}$)alkenyl, ($C_6$-$C_{17}$)aryl, and ($C_7$-$C_{20}$)aralkyl radicals; and most preferably, from the group consisting of hydrogen, ($C_1$-$C_6$)alkyl, ($C_2$-$C_6$)alkenyl, and ($C_6$-$C_{17}$)aryl. The monomers used in the process of the present invention can be prepared by the following reaction scheme:

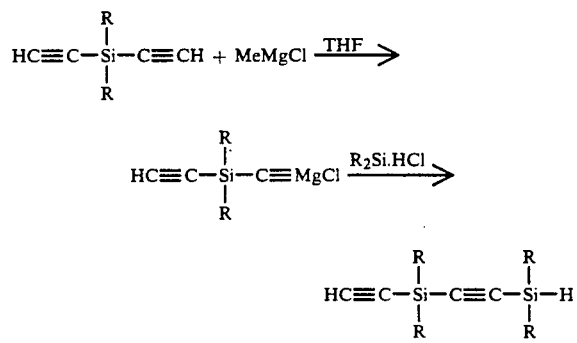

Typical yields for these reactions are between 60% and 90%. These reactions for the preparation of the monomers are generally well known in the art.

The monomers used as starting materials in the present invention can be combined to form a mixture of monomers, each with different functionality, i.e., "R" groups. The preceramic polymers produced from mixtures of the monomers possess a random distribution of the monomer units in the polymer chain. These mixtures of polymers can be used to advantage when selected properties are desired. That is, monomers can be chosen with respect to the "R" groups therein to form polymers that can be tailored for a specific use.

The process of the present invention is a fast, high-yield, route to the preceramic SASV polymers of the present invention. The process is conducted in the presence of a transition metal complex capable of catalyzing a hydrosilation reaction. It can be carried out with or without an external heat source. It can be carried out neat, or in solution. It uses only single bifunctional reagents, i.e., monomers with stoichiometrically fixed functionality, and typically requires no product separation step because no by-products are generally produced.

The process of the present invention is very efficient, resulting in product yields of greater than about 50%, often greater than about 75%, and more often greater than about 90%. Furthermore, the structural purity of the polymers produced by the process of the present invention is typically greater than about 90%, often greater than about 95%, and can be as high as 99%, as evidenced by nuclear magnetic resonance spectroscopy. That is, the process of the present invention is advantageous at least because it is simple and produces the linear SASV polymers in high yields and high structural purity.

The synthesis of the polymers is conducted in the presence of a catalyst, particularly a transition metal catalyst of Groups 8, 9, and 10 (formerly classified as the Group VIIIB or platinum group metals). These include catalysts containing at least one of the following metals: Fe, Ru, Os, Co, Rh, Ir, Ni, Pd, and Pt. The catalyst can be homogeneous or heterogeneous. Preferably, it is a soluble homogeneous catalyst or catalyst system. Although any of the established hydrosilylation catalysts or catalyst systems [e.g., $(Ph_3P)_3RhCl$, $Ph_3P+Pd$, $Pd(PPh_3)_4$, $Ru_3(CO)_{12}$] can be employed, the synthetic procedure is not limited to the use of these catalysts. Preferably, however, the catalyst is a platinum catalyst. More preferably, the catalyst is a Pt(II) or a Pt(0) catalyst, such as $H_2PtCl_6$, $[PtCl_2(C_2H_4)]_2$, $Pt(C_2H_4)(PPh_3)_2$, $[Pt(SiR_3)(\mu-H)(PCy_3)]_2$, and the like. Most preferably, the catalyst is chloroplatinic acid, i.e., $H_2PtCl_6$.

In the process of the present invention, an amount of the catalyst effective to catalyze the polymerization of the monomers is used. This can vary significantly, but preferably an amount is used that will produce the polymers in high yields, i.e., greater than about 50% yields, within a short period of time, i.e., about 20 minutes. Preferably, an "effective amount" of a catalyst is at least about 0.005% by weight of the monomer. More preferably, the amount of the catalyst used is within a range of about 0.005% to 0.1% by weight of the monomer. Generally, about 0.01% of the catalyst relative to the monomer will produce yields of at least about 90%.

The reaction can be carried out neat, or in the presence of an organic solvent or mixture of solvents. The use of a solvent is typically governed by the reactivity of the monomers. For example, if the monomers are reactive and produce an exothermic reaction, a solvent can be used to moderate the reaction. When a solvent is employed for advantage, it can be any suitable inert organic solvent. Preferably, the solvent is an ethereal, polyethereal, or hydrocarbon solvent. More preferably, the solvent is tetrahydrofuran (THF), diethyl ether, benzene, toluene, xylene, or hexane. Most preferably, the solvent is THF.

The reaction is preferably carried out while the materials are stirred or otherwise agitated. For best results, anhydrous reaction conditions are used. That is, it is advantageous to carry out the reaction in a dry inert atmosphere, such as nitrogen or argon, to prevent the introduction of water into the reaction vessel.

The preparation of the polymer typically involves an exothermic reaction. This reaction does not, however, appear to be either time or temperature dependent. A typical reaction can be carried out for as little as 30 minutes at room temperature by cooling the exothermic reaction mixture. Preferably, the reaction is carried out over a period of about 30 minutes to 10 hours. The reaction mixture can also be heated to a temperature of about 60–120° C. to complete the polymerization.

The polymerization reaction typically produces a viscous polymer. The intrinsic viscosity of the polymer is typically within a range of about 0.005 to about 1.50. The viscosity varies depending on pendant groups, temperature, and solvent. To increase the molecular weight of the polymer and improve its mechanical properties, additives that controllably crosslink the polymers can be introduced into the reaction mixture. Examples of such additives include 1,3,5-tris(dimethylsilyl) benzene, bis(dimethylsilyl) acetylene, 1,4-bis(dimethylsilyl)benzene, hydrosiloxane polymers and the like.

The viscous polymer produced in the reaction mixture can be easily purified and dried by conventional techniques. For example, the product of the reaction can be precipitated from solution using a solvent in which the polymer is not soluble, such as, for example, methanol. The product can then be filtered and dried under a vacuum. Other separation techniques will be apparent to those skilled in the art. It is not necessary, however, that all solvent or catalyst be removed after the polymerization step.

The preceramic polymers of the present invention are preferably shaped and then converted to silicon carbide ceramic materials by pyrolysis at elevated temperatures. The pyrolysis typically is carried out in a vacuum or inert atmosphere, such as a helium atmosphere, to avoid oxidation. Specifically, the preceramic polymer is fired at an elevated temperature of at least about 800° C. in an inert atmosphere or vacuum until the preceramic polymer is converted to a ceramic material. Preferably the pyrolysis temperature is within a range of about 900° C. to about 1200° C.

The preceramic polymers of the present invention can be shaped, rendered infusible, and then finally pyrolyzed to give a shaped ceramic article. The shaped preceramic polymers can be rendered infusible, i.e., treated such that they are not generally soluble or capable of being liquified, by various methods. They can also be surface treated to help maintain their shapes. These reactions include, but are not limited to, chemical, photochemical, thermal, and oxidative reactions, and the like. The effectiveness of each method varies with polymer composition.

As an example, the polymers can be doped with a small amount of $ClHSiR_2$, wherein "R" is selected from the group consisting of hydrogen, halogen, alkyl, alkenyl, aryl, and aralkyl radicals, to produce polymers with Si—Cl functionality. These sites can then be hydrolyzed to produce surface cross-linking. Alternatively, the polymers can be crosslinked controllably by mixing with a small amount of a compound containing Si—H functional groups. Examples of such crosslinking compounds include 1,3,5-tris(dimethylsilyl) benzene, bis(dimethylsilyl)acetylene, 1,4-bis (dimethylsilyl)benzene, hydrosiloxane polymers and the like.

As previously stated, the preceramic polymers of the present invention can be used to prepare silicon carbide ceramic materials such as films, powders, coatings, composites, and other shaped articles. They can also be used as infiltrants for the densification of silicon carbide bodies. That is, they can be infiltrated into porous SiC bodies and then fired to densify the SiC bodies. Furthermore, they can be used as preceramic binders for pressureless sintering of SiC powders.

The preceramic polymers of the present invention are particularly suited for the preparation of fibers, at least because the polymers are generally linear. Fibers are long, thin, and threadlike and generally mirror the "shape" of the molecules of which they are made. They are characterized by a high tensile (pulling) strength in the direction of the fiber, which results from the strength of the chemical bonds in the polymeric material. Fibers are typically produced by melt spinning or solution-phase (wet or dry) spinning.

The melt spinning technique is typically used for polymers that are meltable and have a high ratio of viscosity to surface tension. Such polymers typically form fibers that do not form droplets. Generally all the polymers of the present invention can be processed into fibers using the melt-spinning technique. In a typical process, the molten polymer is extruded through a small orifice and stretched into elongated fibers by tension from a take up reel as it is cooled.

Solution spinning methods involve the use of a solvent in which the polymer is soluble at a temperature below the decomposition temperature of the polymer and solvent. The polymer-solvent solution is extruded through a small diameter orifice under pressure. The solvent is then removed from the spinning line either by evaporation (dry spinning), or by precipitating the polymer with solvent (wet spinning). Generally, all the polymers of the present invention can be processed into fibers using solution spinning techniques.

Once formed, polymer fibers are pyrolyzed to form ceramic fibers. If the polymer is thermoplastic, it is preferably surface-crosslinked before it is pyrolyzed so that it will not substantially lose its cylindrical shape during heating.

The following examples are offered to further illustrate the various specific and preferred embodiments and techniques. It should be understood, however, that many variations and modifications may be made while remaining within the scope of the present invention.

EXPERIMENTAL EXAMPLES

Polymer Characterization

Infrared spectra were obtained from KBr pellets and recorded on an IBM Model IR/98 FTIR. Both $^1$H— and $^{13}$C—NMR spectra were obtained from CDCl$_3$ solutions and recorded on a Nicolet Model NT—300 MHz FT spectrometer. Molecular weights were obtained by gel permeation chromatography (GPC) with retention times calibrated against nine narrow-dispersity polystyrene samples (Polymer Labs, Amhurst, MA). GPC analyses were performed on a Beckman liquid chromatograph equipped with an R401 RI detector from Waters Associates (Milford, Mass.). Five $\mu$-Styrogel columns ($10^6$, $10^5$, $10^4$, $10^3$, and 500 Å were employed in series with a THF flow rate of 1 mL/min. These columns are commercially available from Waters Associates (Milford, Mass.), Polymer Labs (Amhurst, Mass.), and Beckman (San Ramon, Calif.). X-ray powder patterns (Mo sample holders) were obtained on a Rigaku diffractometer. Thermogravimetric analyses (TGA) were performed on a DuPont Model 951 thermal analyzer. Polymer pyrolysis was done in graphite crucibles placed into a heated quartz tube which was interfaced either directly to a VG SX 300 quadrupole mass spectrometer or via a Varian 6000 gas chromatograph.

EXAMPLE 1

Polymerization of 3,3,6,6,-Tetramethyl-3,6-disilahexa-1,4-diynes

Chloroplatinic acid, H$_2$PtCl$_6$, (0.001 gram, herein referred to as "CPA") was added to a dry, argon flushed, 50 ml, two-necked, round-bottomed flask (equipped with a magnetic stirrer and dry ice condenser). The flask was then capped with a rubber septum, and 10 ml dry tetrahydrofuran ("THF") was added via a cannula. All manipulations were carried out under an argon atmosphere. The monomer 3,3,6,6,-tetramethyl-3,6-disilahexa-1,4-diyne (5 grams) was added in a dropwise fashion to the flask while stirring the mixture. The mixture was refluxed for 15 minutes. Thereafter, an exothermic reaction ensued. After magnetically stirring the solution at refluxing temperature (approximately 80–90° C.) for 30 minutes, the polymerization was terminated. This was done by cooling the solution to room temperature, and then adding it to 150 ml of methanol. A white powder precipitated out of solution.

The precipitate was isolated by centrifugation. It was then dried to a constant weight under vacuum for 24 hours. The polymer yield was about 90%. This polymer was also formed in 5 minutes without solvent. The resulting polymer had the following characterization: weight average molecular weight, M$_w$ = 19,650; polydispersity M$_w$/M$_n$ = 2.39; $^1$H NMR: $\delta$ 6.69 (s, 2H), 0.24 (s, 12H); $^{13}$C NMR: $\delta$ 148.73 (2C), 113.23 (2C), −1.67 (4C); $^{29}$Si NMR: $\delta$ −31.3. This white polymer was found to be soluble in a variety of organic solvents, such as chloroform, THF, benzene, and toluene. It melted reversibly at approximately 134–136° C.

EXAMPLE 2

Polymerization of 3-Phenyl-3,6,6-trimethyl-3,6-disilahexa-1,4-diyne

Chloroplatinic acid (3 mg) was added to a dry, argon flushed, 5 ml, two-necked, round-bottomed flask (equipped with a magnetic stirrer and a condenser). The flask was then capped with a rubber septum, and 1 ml dry THF was added via a cannula. All manipulations were carried out under an argon atmosphere. The monomer 3-phenyl-3,6,6-trimethyl-3,6-disila-hexa-1,4-diyne (1 gram) was added to this mixture in a dropwise fashion with stirring. An exothermic reaction ensued. After the reaction subsided, the mixture was heated to reflux (approximately 80–90° C.) for 30 minutes. The condenser was then removed, and the solvent was removed via distillation. A viscous mixture resulted. This was stirred at 100° C. overnight (approximately 14 hours). The resulting polymer had the following characterization: weight average molecular weight, $M_w = 28,000$; polydispersity $M_w M_n = 3.08$; $^1H$ NMR: δ 7.60 (m, 2H), 7.34 (m, 3H), 6.82 (s, 2H) 0.48 (s, 3H), 0.26 (s, 6H); $^{13}C$ NMR: δ 150.53 (1C), 146.97 (1C), 134.92 (1C), 134.3 (2C), 129.59 (1C, 127.92 (2C), 115.31 (1C), 111.20 (1C), −1.68 (2C), −2.62 (1C); $^{29}Si$ NMR: δ 25.61 (1Si), −30.14 (1Si).

EXAMPLE 3

Polymerization of 3,3-Dicyclohexyl-6,6-dimethyl-3,6-disilahexa-1,4-diyne

Chloroplatinic acid (1 mg) was added to a dry, argon flushed, 10 ml, two-necked, round-bottomed flask (equipped with a magnetic stirrer and a condenser). The flask was then capped with a rubber septum, and 1 ml dry THF was added via cannula. All manipulations were carried out under an argon atmosphere. The monomer 3,3-dicyclohexyl-6,6-dimethyl-3,6-disilahexa-1,4-diyne (0.5 gram) was added dropwise to the flask at room temperature with stirring. The mixture was refluxed at 80° C. for one hour. The solvent was removed and the mixture was heated at 130° C. for 4 hours. The resultant resin-like polymer had a softening temperature of 55–60° C., a weight average molecular weight ($M_w$) of 12,890, and a polydispersity ($M_W/M_R$) of 2.39. Long fibers could be pulled by hand from the polymer melt.

EXAMPLE 4

Polymerization of 3-Diphenyl-6,6-dimethyl-3,6-disilahexa-1,4-diynes

CPA mg) and the monomer 3,3-diphenyl-6,6-dimethyl-3,6-disilahexa-1,4-diyne (1 ml) were added to a dry, argon flushed, 10 ml, two-necked, round bottomed flask (equipped with a magnetic stirrer and a condenser). The mixture was heated to 100° C. for 1 minute, to start the reaction. After an induction period of a few minutes a vigorous reaction began. The mixture became hot (approximately 100° C.), remained hot for approximately 5 minutes, and the slowly cooled to room temperature. A solid product formed. The solid product had a softening point of 60° C., and could form fibers from a polymer melt very easily. GPC: $M_w = 150,000$; PDI = 4.08

EXAMPLE 5

Copolymerization of Two Different Monomers

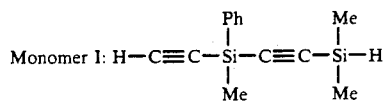

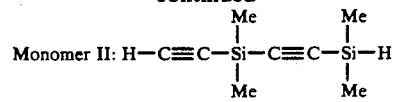

A catalytic amount of CPA (1-2 mg) and THF (2ml) were added to an oven-dried, argon-purged, 25 ml flask, which was equipped with a magnetic stirring bar and a condenser. The solution was heated to a refluxing temperature (approximately 80° C.) under an argon atmosphere. The premixed monomers, consisting of monomer I (0.73 g, 3.2 mmol) and monomer II (1.71 g, 10.3 mmol) were added dropwise. After the reaction subsided, the solvent was removed by distillation. The mixture was then heated to 120° C. overnight in an effort to increase the molecular weight of the polymer. The polymer was redissolved in THF and added dropwise to a large volume of methanol with stirring. A white powder precipitated out of solution. The polymer obtained was a white solid (1.86 g, 74% yield, m.p. 80–90° C.). It had a weight average molecular weight of 23,400, and a polydispersivity (Mw/Mn) of 3.3. The spectroscopic analysis indicated that the monomers were combined into the chain randomly. The monomer composition (mole ratio) in the polymer was close to the feed composition as shown below. For this formula $a = 0.32$, $b = 0.68$, and $m = $ ca. 100.

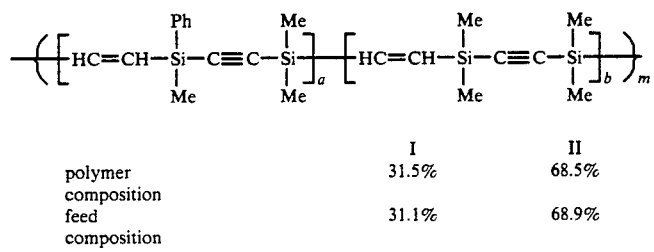

|  | I | II |
|---|---|---|
| polymer composition | 31.5% | 68.5% |
| feed composition | 31.1% | 68.9% |

EXAMPLE 6

Copolymerization of Two Different Monomers Plus Additives

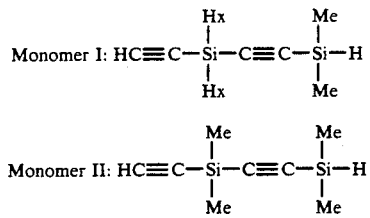

Hx = cyclohexyl group

A catalytic amount of CPA (1 mg) and 5 ml of THF were added to a 25 ml flask, which was equipped with a magnetic stirring bar and a condenser. All manipulations were carried out under argon. Monomer I (1 ml) was added to the flask and the mixture was stirred for 5 minutes. Monomer II (5 ml) was then added dropwise to the flask. The addition of Monomer II was at a slow enough rate to maintain the reaction under gentle reflux. After addition, the mixture was refluxed for two hours. It was then allowed to cool to 70° C. at which point polymer precipitated out of solution. A GPC analysis of the aliquot of the mixture indicated a weight average molecular weight of 10,000.

To increase the molecular weight of the polymer and improve its mechanical properties, a small amount of bisdimethyl-1,4-disilabenzene (0.1 ml in 10 ml THF) was added to the reaction mixture. The mixture was then refluxed for 2 hours. The weight average molecular weight of the polymer increased to 52,700, with a polydispersivity of 2.4. A small amount of the mixture was concentrated by solvent evaporation and pulled into long polymer fibers. The polymer had softening temperature of approximately 120–123° C. Long fibers could be pulled from the melt. Adding a small amount ClHSiMe (0.1–10%) to the crude mixture produced polymers with Si—Cl functionality. Polymer fibers with Si—Cl sites have been hydrolysed to produce surface crosslinking which keeps the fibers from losing their shape at higher temperature.

EXAMPLE 7

Crosslinking of Polymer

Crude polymer (0.8 grams) from Example 1 was added to a 5 ml flask, equipped with a magnetic stirring bar. The crude polymer contained a trace amount of the catalyst $H_2PtCl_6$. To this was added 0.05 grams of 1,3,5-tris(dimethyl-silyl)benzene. The mixture was heated to 140° C. at that temperature for about 5 minutes. A white crosslinked polymer was produced.

EXAMPLE 8

Polymer pyrolysis to SiC

Two polymer samples from Example 1 (about 1 gram each) were placed in graphite boats inside an alumina tube. The polymer samples were fired by increasing the temperature to about 1200° C. at a rate of about 20° C./min. under a helium atmosphere in a Lindburg tube furnace. The flow rate of He was 5 ml/min. Ceramic materials were obtained (50 and 55 weight percent ceramic yields, respectively). One ceramic sample was further heated to about 1800° C. under a He atmosphere and held at that temperature for about 3 hours, with no significant weight loss (approximately 1%). X-ray powder diffraction of the ceramic materials showed peaks at 111 ($2\theta=35.6°$), 220 ($2\theta=60°$), and 311 ($2\theta=71.9°$), which correspond to the $\beta$-SiC structure observed. Combustion analyses (TGA analyses) of the ceramic materials, performed in a manner similar to the pyrolysis, indicated the presence of SiC and excess carbon.

All patents, patent documents and publications cited hereinabove are incorporated by reference herein. The foregoing detailed description has been given for clarity of understanding only and no unnecessary limitations are to be understood therefrom. The invention is not limited to the exact details shown and described, for obvious modifications will occur to those skilled the art.

What is claimed is:

1. A process for densifying a porous SiC body comprising:
   (a) infiltrating a porous SiC body with a diorganosilacetylene-alt-diorganosilvinylene linear polymer of the formula $—[—(R^1)(R^2)Si—C\equiv C—(R^3)(R^4)Si—CH\equiv CH—]_n$; wherein $n\geq 2$, and each $R^1$, $R^2$, $R^3$, and $R^4$ is independently selected from the group consisting of hydrogen, halogen, alkyl, alkeny, aryl, and aralkyl radicals; and
   (b) pyrolyzing the porous SiC body infiltrated with a silacetylene-alt-diorganosilvinylene linear polymer to form a densified ceramic SiC body.

2. The process of claim 1, wherein the polymer has a weight average molecular of at least about 2,000.

3. The process of claim 2 wherein the polymer has a polydispersity between about 1.01 and 10.0.

4. The process of claim 1 wherein the polymer has a weight average molecular weight of between about 2,000 and about 120,000.

5. The process of claim 1 wherein each $R^1$, $R^2$, $R^3$, and $R^4$ is independently selected from the group consisting of hydrogen, alkyl, alkenyl, aryl, and aralkyl radicals.

6. The process of claim 5 wherein $n=20-500$.

7. The process of claim 1 wherein each $R^1$, $R^2$, $R^3$, and $R^4$ is independently selected from the group consisting of hydrogen, $(C_1-C_{20})$alkyl, $(C_2-C_{20})$alkenyl, $(C_6-C_{17})$ aryl, and $(C_7-C_{20})$ aralkyl radicals.

8. The process of claim 7 wherein the polymer has a weight average molecular weight of between about 2,000 and about 120,000.

9. The process of claim 1 wherein each $R^1$, $R^2$, $R^3$, $R^4$ is independently selected from the group consisting of hydrogen, $(C_1-C_6)$alkyl, $(C_2-C_6)$ alkenyl, and $(C_6-C_{17})$aryl.

10. The process of claim 9 wherein $n=2-800$.

11. The process of claim 9 wherein the polymer has a weight average molecular weight of between about 10,000 and about 60,000.

* * * * *

UNITED STATES PATENT AND TRADEMARK OFFICE
CERTIFICATE OF CORRECTION

PATENT NO. : 5,312,649
DATED : May 17, 1994
INVENTOR(S) : Thomas J. Barton et al.

It is certified that error appears in the above-indentified patent and that said Letters Patent is hereby corrected as shown below:

Title page,
item [54] line 3, Title 3 should read --process "of" densifying--therefor.

item [56] Other Publications 4th Cite "Ijadi-Maghsoodi" should read --S. Ijadi-Maghsoodi-- therefor.

item [56] Other Publications 5th Cite "Ijadi-Maghsoodi" should read --S. Ijadi-Maghsoodi-- therefor.

item [56] Other Publications 6th Cite "Nitta" should read --S.Nitta-- therefor.

item [56] Other Publications 5th Cite "Polymer chemistry" should read --Polymer Chemistry-- therefor.

UNITED STATES PATENT AND TRADEMARK OFFICE
CERTIFICATE OF CORRECTION

PATENT NO. : 5,312,649
DATED : May 17, 1994
INVENTOR(S) : Thomas J. Barton et al.

It is certified that error appears in the above-indentified patent and that said Letters Patent is hereby corrected as shown below:

Column [56] Other Publications 5th Cite "Pang" should read --Y. Pang-- therefor.

Column [56] Other Publications 8th Cite "Pyrolisis" should read --Pyrolysis-- therefor.

Colum 1 line 3 "Process Densifying" should read --Process of Densifying-- therefor.

Column 8 Line 5 "500Å" should read --500Å)-- therefor.

Column 8 Line 64 "disila-hexa" should read --Disilahexa-- therefor.

Column 9 Line 6 "$M_w M_n$" should read --$M_w/M_n$-- therefor.

Column 9 Line 10 "25.61" should read -- -25.61-- therefor.

Column 9 Line 48 "CPA mg" should read --CPA (1mg)-- therefor.

Column 11 Line 29 "140°C at" should read --140°C and stirred at-- therefore.

UNITED STATES PATENT AND TRADEMARK OFFICE
CERTIFICATE OF CORRECTION

PATENT NO. : 5,312,649
DATED : May 17, 1994
INVENTOR(S) : Thomas J. Barton et al.

It is certified that error appears in the above-indentified patent and that said Letters Patent is hereby corrected as shown below:

Column 11 Example 8 Title "pyrolysis" should read --Pyrolysis-- therefor.

Column 12 Line 19 "alkeny" should read --alkenyl-- therefor.

Column 12 Line 24 "molecular of" should read --molecular weight of--

Signed and Sealed this

Third Day of September, 1996

Attest:

BRUCE LEHMAN

Attesting Officer

Commissioner of Patents and Trademarks